(12) United States Patent
Reinoehl et al.

(10) Patent No.: US 8,997,963 B2
(45) Date of Patent: Apr. 7, 2015

(54) CAM HARD STOP FOR END OF LIFE

(71) Applicant: Eaton Corporation, Cleveland, OH (US)

(72) Inventors: Troy Scott Reinoehl, Golden, CO (US);
Steven Michael Peterson, LaOtto, IN (US); James Lee Whitaker, Hicksville, OH (US); Clinton Lee McClellan, Fort Wayne, IN (US); Steven Joe Rynearson, Jr., Auburn, IN (US); James Robert Hockemeyer, Hoagland, IN (US); John Alan Schenkel, III, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/223,211

(22) Filed: Mar. 24, 2014

(65) Prior Publication Data

US 2014/0284165 A1    Sep. 25, 2014

Related U.S. Application Data

(60) Provisional application No. 61/804,221, filed on Mar. 22, 2013, provisional application No. 61/953,140, filed on Mar. 14, 2014, provisional application No. 61/952,954, filed on Mar. 14, 2014.

(51) Int. Cl.
*F16D 13/75* (2006.01)
*F16D 13/40* (2006.01)

(52) U.S. Cl.
CPC .............. *F16D 13/40* (2013.01); *F16D 13/757* (2013.01)

(58) Field of Classification Search
CPC ...................................................... F16D 13/40
USPC .................... 192/111.2, 111.19, 111.5, 111.3
See application file for complete search history.

(56) References Cited

U.S. PATENT DOCUMENTS

| | | | |
|---|---|---|---|
| 5,934,429 A | 8/1999 | Jennings | |
| 6,053,297 A * | 4/2000 | Kummer | 192/70.27 |
| 6,098,773 A * | 8/2000 | Blessinger et al. | 192/70.252 |
| 6,109,412 A | 8/2000 | Cole et al. | |
| 6,296,099 B1 | 10/2001 | Gochenour | |
| 6,957,729 B2 * | 10/2005 | Osman et al. | 192/70.252 |

* cited by examiner

*Primary Examiner* — Richard Lorence
*Assistant Examiner* — David Morris
(74) *Attorney, Agent, or Firm* — Warn Partners, P.C.

(57) ABSTRACT

A dry friction clutch is provided having an innovative baffle design wherein the baffle has a tab that sets the limit for maximum adjustment of an adjustment mechanism of the dry clutch.

20 Claims, 9 Drawing Sheets

CAM HARD STOP FOR END OF LIFE

CROSS-REFERENCE TO RELATED APPLICATIONS

This application claims the benefit of U.S. Provisional Application No. 61/804,221, filed Mar. 22, 2013, U.S. Provisional Application No. 61/953,140, Filed Mar. 14, 2014 and U.S. Provisional Patent Application No. 61/952,954, filed Mar. 14, 2014.

FIELD OF THE INVENTION

The present invention relates to dry friction clutches, especially dry friction clutches utilized for connecting an engine with a transmission of a vehicle.

BACKGROUND OF THE INVENTION

Dry friction clutches are often utilized to allow for selective engagement of an engine with an input shaft of a transmission. Many dry clutches have a cover that is spaced from and connected with an engine flywheel. Inside the cover is a pressure plate that is torsionally connected to the cover and is axially moveable towards the flywheel. Positioned between pressure plate and flywheel is a friction disc. The friction disc is torsionally connected with an input shaft of a transmission. To urge the pressure plate towards the flywheel to capture the friction disc with the flywheel, there is an apply spring or spring loaded lever. As the friction lining of the friction disc wears, adjustment is required. To provide for adjustment, many clutches have a multiple cam ring adjuster between the apply spring or lever and the pressure plate. Many of the adjuster arrangements have a first cam ring that is non-rotative that engages a second rotative ring. A torsional spring is provided to urge the second cam ring to rotate with respect to the first cam ring. As the second cam ring rotates, the distance between the apply spring or lever and an extreme end of the pressure plate increases to compensate for the friction plate wear.

Examples of dry friction clutches with cam ring adjustment mechanisms can be found by a review of U.S. Pat. Nos. 5,964,429 and 6,109,412 and 6,292,099. It is also desirable in dry friction clutches with adjustment mechanisms to limit the maximum amount of adjustment. The friction material linings of the friction disc are typically attached to a steel backing plate by recessed rivets. Over adjustment of the pressure plate can allow the pressure plate to force the rivets of a worn friction disc into the engine flywheel causing undesired damage. It is desirable to provide an adjustment limiting feature that can be modified for clutch friction discs having different lining thicknesses or different desired maximum adjustment without extensive redesign of the clutch or the clutch adjustment mechanism. It is also desirable to provide an adjustment mechanism for a dry friction clutch wherein a baffle that protects a torsional spring between first and second cam rings can be easily assembled to the second cam ring without the utilization of tools, and wherein the baffle can be utilized in piloting a position of a second cam ring with respect to a first cam ring. It is also desirable for a baffle to be a secondary device to prevent dislodgement of a torsional spring from the first cam ring.

Other advantages of the present invention will become more fully apparent from a review of the invention as it is provided in the detailed description.

SUMMARY OF THE INVENTION

To fulfill the above noted and other manifold desires, a revelation of the present invention is brought forth. In a preferred embodiment, the present invention brings forth a dry friction clutch having an innovative baffle design wherein the baffle has a tab that sets the limit for maximum adjustment. Thereby when an adjustment limit is desired to be modified, modification can be accomplished by a simple replacement of the baffle. In related embodiments of the present invention, the baffle can be assembled to a second cam ring without the use of tools and the baffle can be utilized as a function to radially pilot the secondary cam ring with respect to the first cam ring and additionally provides secondary protection to inhibit inadvertent dislodgement of from a torsional spring from a pressure plate first cam ring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
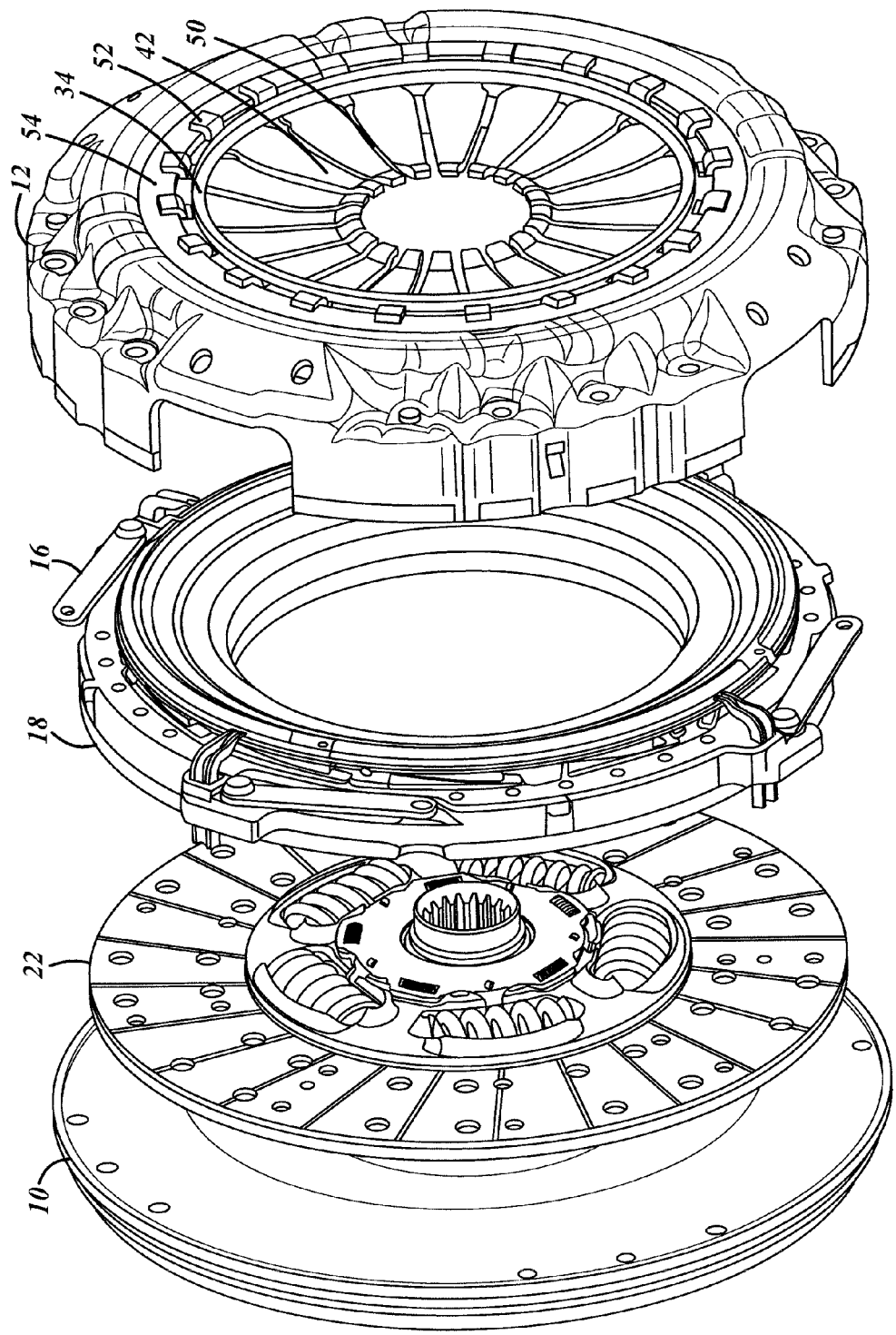
FIG. 1 is an exploded view of a dry friction clutch according to the present invention.
Figure 2:
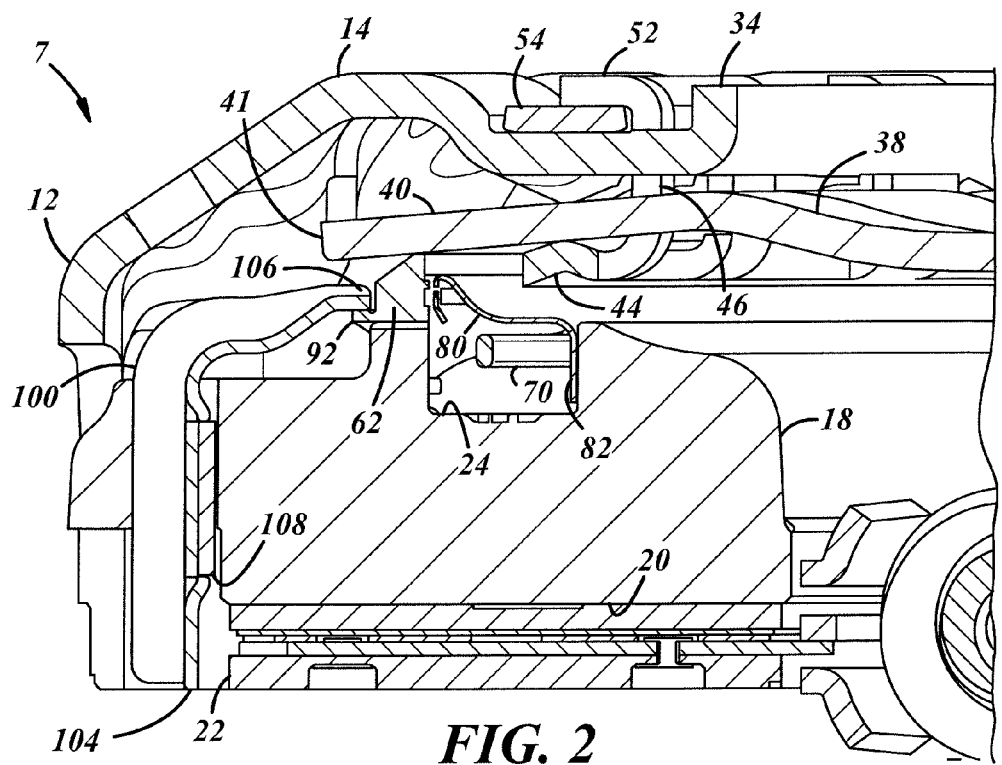
FIG. 2 is a partial sectional view of the clutch shown in FIG. 1.

The following description of the preferred embodiment(s) is merely exemplary in nature and is in no way intended to limit the invention, its application, or uses.

Referring to FIGS. 1-14, a selectively engagable dry friction clutch assembly 7 is provided. The clutch assembly 7 selectively connects an input shaft of a transmission (not shown) with a flywheel 10 of an engine (not shown). The clutch assembly 7 includes a cover 12. The cover 12 is typically a steel forging or stamping and is generally U-shape with a central opening. The cover 12 has a main body 14 that is axially spaced from the flywheel 10 and is torsionally connected thereto by a series of bolts (not shown). Torsionally connected to the cover 12 by spring straps 16 is a pressure plate 18. The pressure plate 18 has a lower flat annular surface 20 for engagement with a friction disc 22. On a side generally opposite surface 20, the pressure plate 18 has an annular groove 24. The annular groove 24 has a radially inner wall 26. Projecting axially from the annular groove 24 is a roll pin 28. An outer perimeter of the annular groove 24 is formed by multiple ramps 30 which combine to provide an integral first cam ring 32. The first cam ring 32, if desired, can be a separate ring fixed to the pressure plate.

As mentioned previously, the cover 12 has an inner opening which is bordered by a lip 34. Adjacent to the lip 34 is a series of holes 36. Positioned inside of the cover 12 is a clamping member or diaphragm spring 38. Diaphragm spring 38 is a disc-shaped Belleville spring having a continuous solid outer rim portion 40. Projecting radially inward from the rim 40 is a series of leaves 42.

Holding the diaphragm spring 38 in position is a lower fulcrum ring 44. The lower fulcrum ring 44 typically is produced from steel and has an annular portion formed into a point to contact the diaphragm spring 38. The lower fulcrum 44 has a series of arms or C-frames 46. The C-frames 46 extend upwardly through diaphragm spring slot enlargements 48 that are at a base of radial slots 50 which separate the spring leaves 42. The C-frames 46 also extend through holes 36 of the cover. The ends of the C-frame 46 form tabs 52. Tabs 52 are tensioned by a Bellville washer preload spring 54. The preload spring 54 effectively causes the C-frame tabs 52 to be pushed upward causing the ring portion of the lower fulcrum 44 to load the diaphragm spring 38 and also hold it in position. The rim 40 of the diaphragm spring 38 pushes downward on the pressure plate 18 (via an adjustment assembly 60 to be described later). The pressure plate 18 is axially movable with respect to the cover 12. The clamping movement of the pressure plate 18 is induced by the clamping load of the diaphragm spring 38 causing the pressure plate 18 to engage with a friction disc 22. The friction disc (which is axially movable upon the transmission input shaft) are engaged frictionally with the flywheel 10 to torsionally connect the engine with the input shaft of the transmission. In the normal state of operation, the clutch assembly 7 engages the transmission with the engine unless the clutch is released.

To torsionally disconnect the transmission from the engine, a shift fork (not shown) contacts an inner portion of the leaves 42 causing the diaphragm spring 38 to elastically deform causing its outer rim portion 40 to pivot about the lower fulcrum 44 causing its outer radial edge to pivot away from the pressure plate 18 to allow the pressure plate 18 to disengage from the friction disc 22, thereby allowing the transmission input shaft to be disengaged from the engine.

Juxtaposed between the pressure plate 18 and the diaphragm spring 38 is an adjustment assembly 60. The adjustment assembly is provided to allow the clutch to compensate for wear of the friction disc 22. The adjustment assembly 60 includes the aforementioned first cam ring 32. Engaged with the first cam 32 is a second cam ring 62. The second cam ring 62 has a tip 64 to transfer the clamping load provided by the diaphragm spring 38 to the pressure plate 18. A bottom portion of the second cam ring 62 has a series of ramps 66 for engagement with the first cam ring 32. Relative rotation of the second cam ring 62 with respect to the first cam ring 32 causes an increase in the effective distance between the diaphragm spring 38 and the surface 20 of the pressure plate to compensate for wear reducing thickness of the friction disc 22.

Figure 5:
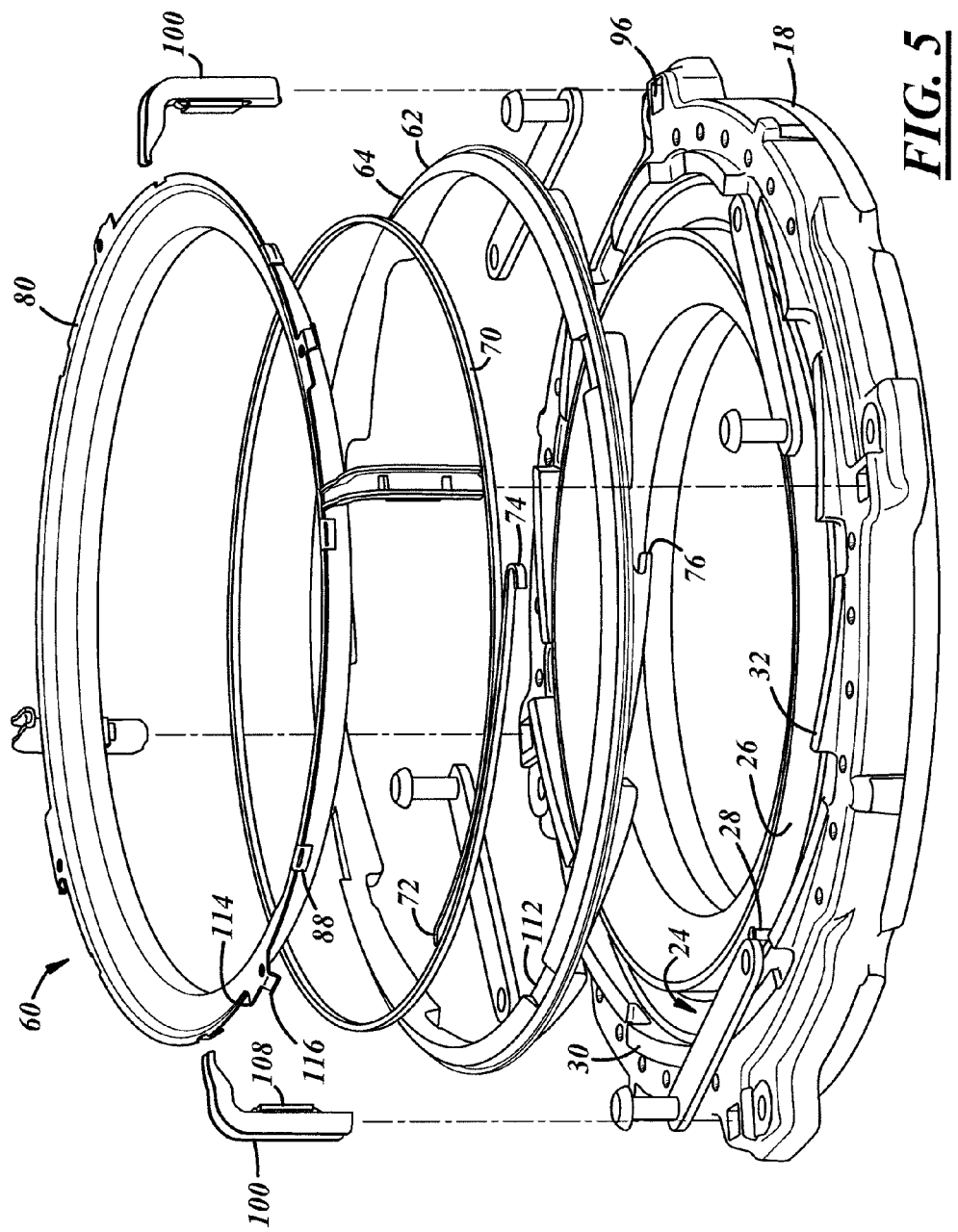
FIG. 5 is an exploded view of the adjustment mechanism of the clutch illustrated in FIG. 1.
Figure 6:
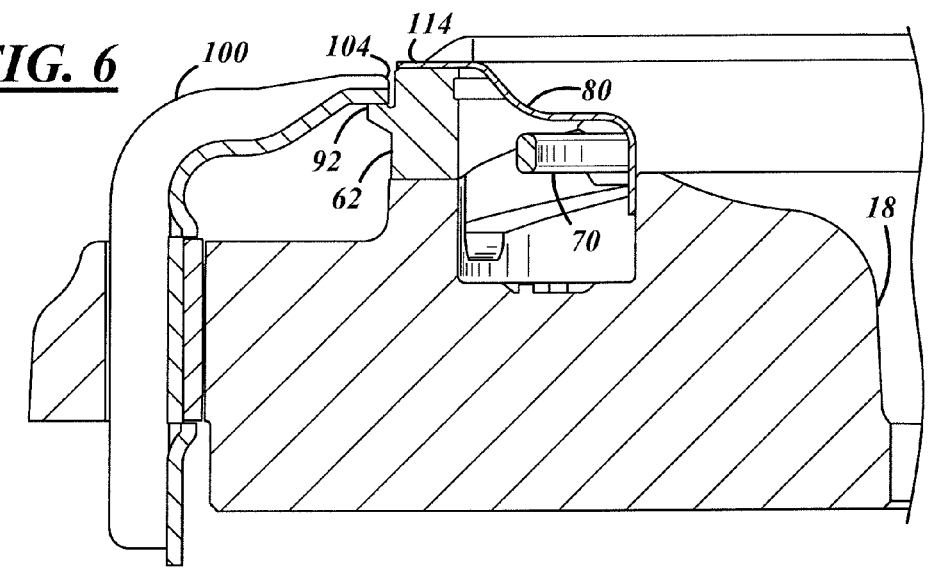
FIG. 6 is a view similar to that of FIGS. 2 and 3 with some components of the clutch deleted for clarity of illustration illustrating the adjustment mechanism at its limit of adjustment.
Figure 10:
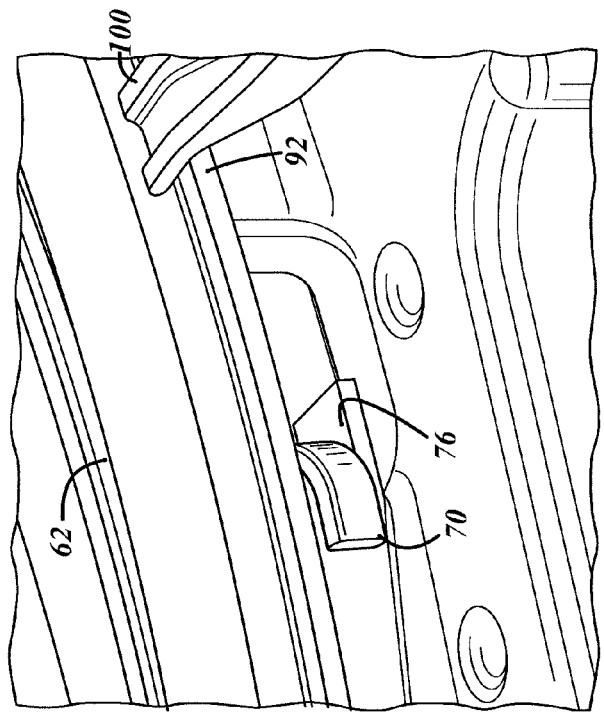
FIG. 10 is a partial perspective view illustrating a connection of the torsional spring with a second cam ring for the clutch of the present invention.
Figure 9:
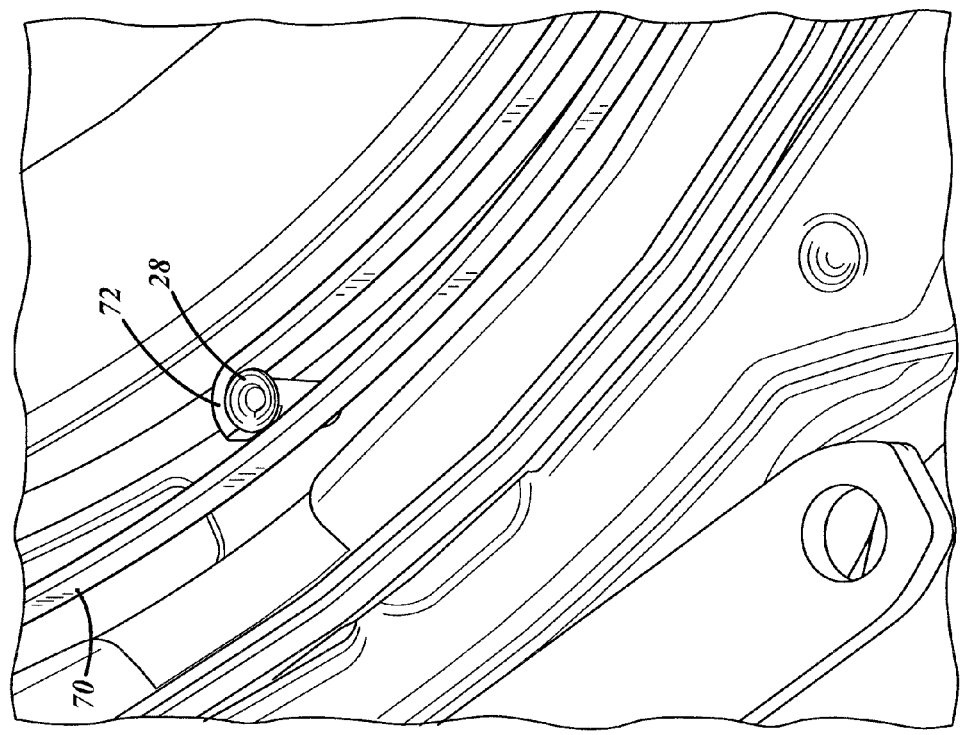
FIG. 9 is a partial perspective view illustrating connection of a torsional spring connected with a pin that is connected to the pressure plate of the clutch of the present invention.

To urge the second cam ring 62 to have relative rotation with respect to the first cam ring 32, there is provided a torsion spring 70. The torsion spring 70 at one extreme end has an eyelet 72 that encircles roll pin 28 (FIG. 5 and). An opposite extreme end of torsion spring 70 has an eyelet 74 which hooks into a slot 76 provided in the second cam ring (FIGS. 5 and 10). Torsional spring 70 seeks to straighten out from its wound position within the annular groove 24 of the pressure plate 18 thereby causing the second cam ring 62 to rotate with respect to the first cam ring 32.

Figure 11:
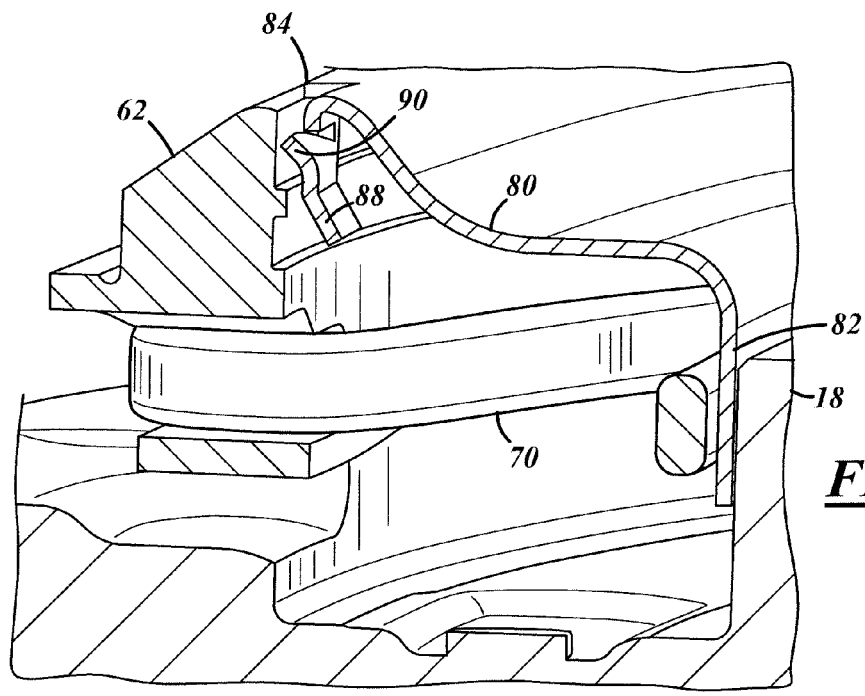
FIG. 11 is an enlarged partial sectional view illustrating an assembly operation of connecting a baffle with the second cam ring of the clutch of the present invention and the piloting of the second cam ring by virtue of the baffle.
Figure 12:
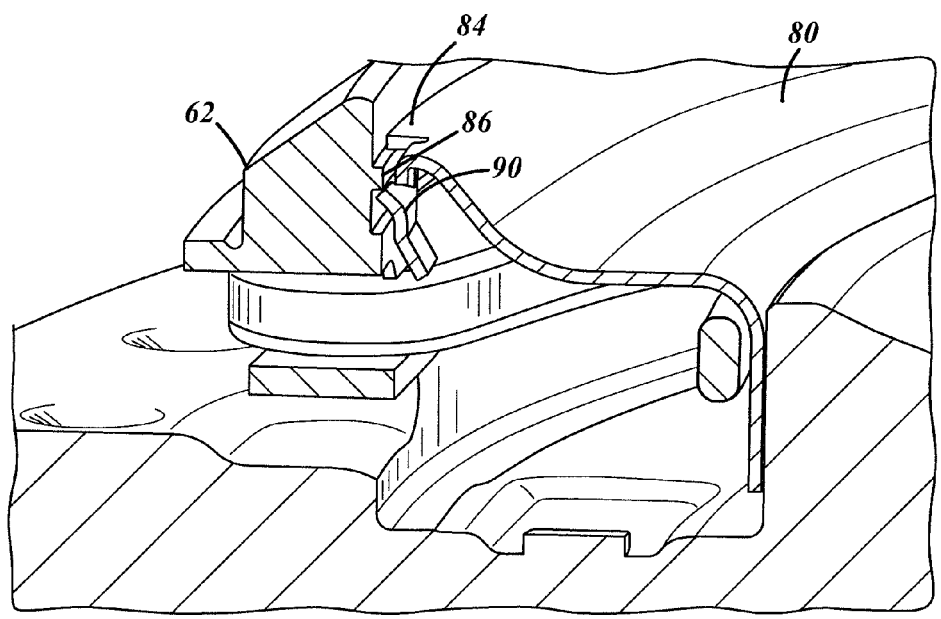
FIG. 12 is a view similar to that of FIG. 11 illustrating completion of the assembly of the baffle to the secondary cam ring.
Figures 13, 14:
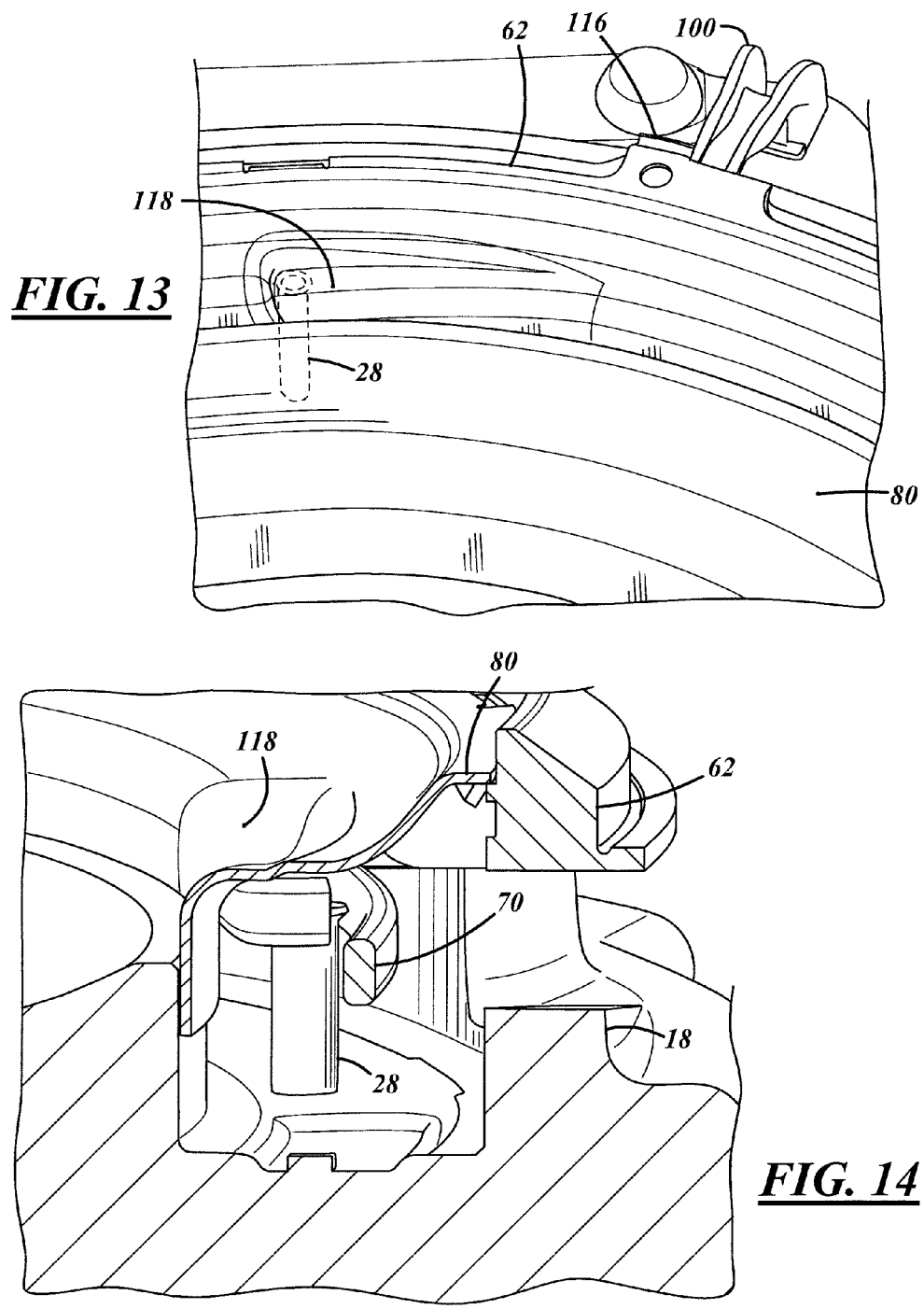
FIG. 13 is a partial perspective view illustrating utilization of a depression ramp of the baffle and preventing dislodgement of the torsional spring from the first cam ring and pressure plate.
FIG. 14 is a sectional view of the portion of the clutch shown in FIG. 13.

Connected with the second cam ring 62 is a baffle 80. The baffle 80 environmentally protects torsion spring 70 from dirt and other debris. The baffle 80 has a generally axially orientated inner radial wall 82. The inner radial wall 82 is positioned generally adjacent to the radially inner wall 26 of the pressure plate annular groove 24 and is piloted by the same. The baffle 80 is typically a stamping. The baffle 80 has a main radial edge 84 that when placed in position, rests upon a middle radial step 86 provided on an inner diameter of the second cam ring 62 (FIGS. 11 and 12). The baffle 80 has a downward stamped finger 88 with a punched out barb 90. When the baffle 80 is assembled to the second cam ring 62, the main radial edge rests upon the step 86 and the barb 90 elastically deforms to engage and snap under step 86 to give a snap fit arrangement which is extremely secure. Four or six barbs 90 geometrically spaced are typically utilized to allow the baffle 80 to be assembled to the second cam ring 62 without any special tooling while yet providing an extremely secure connection between the baffle 80 and second cam ring 62. Secondly, the positioning of the baffle inner radial wall 82 adjacent the radially inner wall 26 of the pressure plate annular groove 24 allows the radial positioning of the second cam ring 62 to be piloted to provide lateral stability between the second cam ring 62 and the first cam ring 32.

The second cam ring 62 along its outer periphery has a radial rim 92. The second cam ring 62 also has four radially extending slots 94.

The pressure plate 18 has a series of bores to allow for attachment by spring straps 16 with the cover 12. By virtue of the flexibility of the spring straps 16, pressure plate 18 can move axially with respect to the cover 12. Additionally, the pressure plate 18 has a series of generally rectangular through apertures 96. Positioned within the apertures 96 are control fingers 100. Control fingers 100 are typically provided by a copper coated stamp steel member having stamped out tabs 102. A bottom extreme end 104 is provided for contact with the engine flywheel 10. The control finger 100 has a perpendicular extending extreme end 106. The control finger 100 is positionally inserted within the rectangular aperture 96 of the pressure plate 18 with the extreme end 106 pointed radially inwardly. A leaf spring 108 is positioned between the tabs 102 and upon insertion into the rectangular aperture 96, expands outwardly to frictionally capture the control finger 100 with the pressure plate 18. Typical forces may vary per application, but typical loads of retention to retain the control finger 100 in its position are approximately five hundred pounds force. The extreme end 106 is positioned adjacent to the radial rim 92 of the second cam ring 62. The control finger will prevent rotation of the second cam ring 62 with respect to the first cam ring 32 unless adjustment is appropriate.

Diaphragm spring 38 acts as a clamping member loading point 64 of second cam ring which in turn forces downwardly upon the first cam ring 32 integral with the pressure plate 18 to cause the pressure plate 18 to clamp downward on the friction disc 22 against the flywheel 10 of the engine thereby torsionally connecting the engine with the transmission input shaft of a vehicle. To torsionally release the transmission from the engine, a push type shift fork (not shown) is utilized to push the leaves 42 of the diaphragm spring 38 towards the pressure plate 18 causing the rim 40 of the diaphragm spring to pivot about the lower fulcrum 46 causing the radial edge 41 of the diaphragm spring 38 to pivot away from the pressure plate 18 to allow the clutch 7 to release. A pull back of the shift fork relieves the leaves 42 allowing the diaphragm spring 38 to re-engage with the point 64 of the second cam ring thereby torsionally reconnecting the transmission with the engine. If the friction pads of the friction disc 22 are not sufficiently worn, no adjustment can occur due to the fact that the control fingers 100 engagement with second cam ring 62 radial rim 92 will prevent any adjustment. Upon sufficient wear of the friction disc 22 that adjustment is required, relative movement of the pressure plate with respect to the control fingers 100 will occur upon the control fingers 100 engagement with the flywheel 10 of the engine. An adjustment gap 110 is generated between the control finger and the radial rim 92. One feature of the control arms in their frictional engagement with the rectangular apertures is that relative movement of the control arms with respect to the pressure plate 18 will not occur due to vehicle engine or transmission vibrationary events, but will only occur when there has been wear of the friction discs 22 since the diaphragm spring 38 is the only thing that can apply sufficient force to force the adjustment gap between the control finger 100 and the radial rim 92 of the secondary cam ring 62. Upon the next release of the pressure plate 18 from the frictional disc 22, second cam ring 62 will now be free to rotate relative to the first cam ring 32 to raise the radial rim 92 until it is again limited by contact with the extreme end 106 of the control fingers 100. Thereby the effective distance between point 64 of the second cam ring and the surface 20 of the pressure plate 18 will be adjusted to compensate for a reduced thickness of the lining of the friction disc 22.

Figure 7:
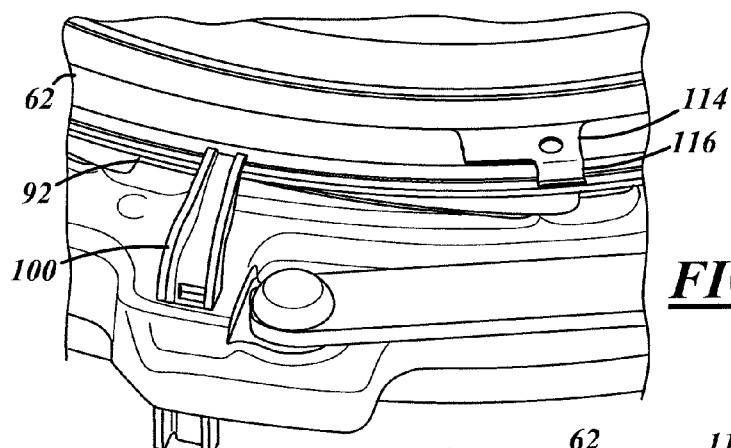
FIG. 7 is a partial side perspective view of the clutch shown in FIG. 2 when the friction lining is in essentially new condition.
Figure 8:
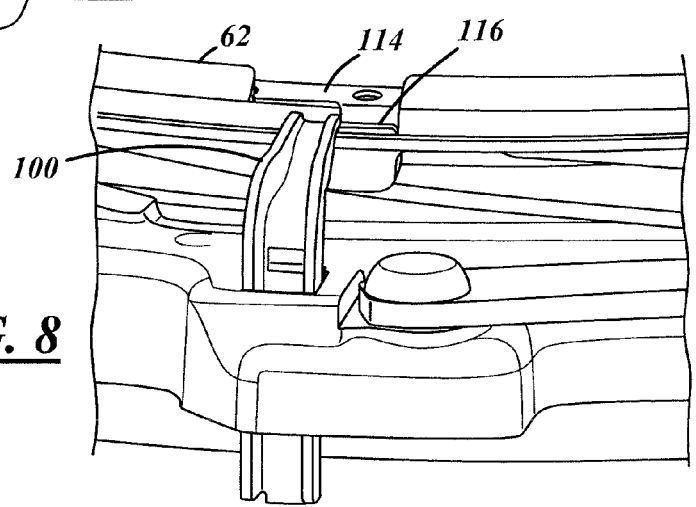
FIG. 8 is a view similar to that of FIG. 7 illustrating the clutch when it is at its end of adjustment.

It is often desirable to limit the maximum amount adjustment of the adjusting assembly 60. It is undesirable to allow the friction lining to be engaged when it is so thin that rivets holding the friction pad material to the underlying metal plate can then be exposed and cause damage to the flywheel 10. It is also desirable to limit relative rotation of the second cam ring 62 with respect to the first cam ring 32 such that the ramps 30 and 66 cannot go past each other causing the adjustment assembly 60 to return to its initial new friction disc position. The second cam ring 62 has a series of radial slots 112. Placed within the slots 112 of the second cam ring 62 are radially outward projecting tabs 114 of the baffle. The tabs 114 of the baffle 80 have a V-shaped cross-sectional extension 116. Tabs 114 are simply extensions of the main radial edge 84 of the baffle. Placement of the tabs 114 within secondary cam ring slots 112 also ensures the proper radial orientation of the baffle 80 with respect to the secondary cam ring 62. When the friction discs are new, radial slots 114 are angularly spaced away from the control fingers 100 (FIG. 7). As the secondary cam rotates during adjustment operation, it will rotate closer and closer to the control fingers 100. At the maximum state of desired adjustment, projection 116 contacts the control finger 100 thereby setting a limit of maximum adjustment of the adjustment assembly 60 (FIG. 8).

Another feature of the baffle 80 is a ramp depression 118 (FIGS. 13 and 14) which is positioned adjacent to the roll pin 28. Ramp depression 118 is ramped axially downward toward the pressure plate annular groove 24 in an area adjacent to the roll pin 28. As the adjustment assembly reaches its state of maximum adjustment, the ramp depression 118 ensures that the axial space between the top of the roll pin 28 and the baffle 80 is less than the thickness of the torsional spring 70 in the axial direction to ensure that the eyelet of the torsion spring 70 cannot dislodge from the roll pin 28 (even though the second cam ring 62 is moving axially away from the first cam ring 32 during adjustment). The roll pin 28 has a head to prevent this, but the ramp depression 118 of the baffle ensures a secondary backup to prevent adjustment assembly malfunction due to torsional spring release.

A major advantage of utilizing a tab extension 116 on the baffle 80 to limit maximum adjustment is that applications which utilize different thicknesses of friction pad material, or customers who desire to limit adjustment to different amounts can be easily accommodated by simply adjusting the location of the tab projection 116 on the radially outward projecting tab 114 without having major re-design of the clutch or adjustment assembly.

Figure 15:
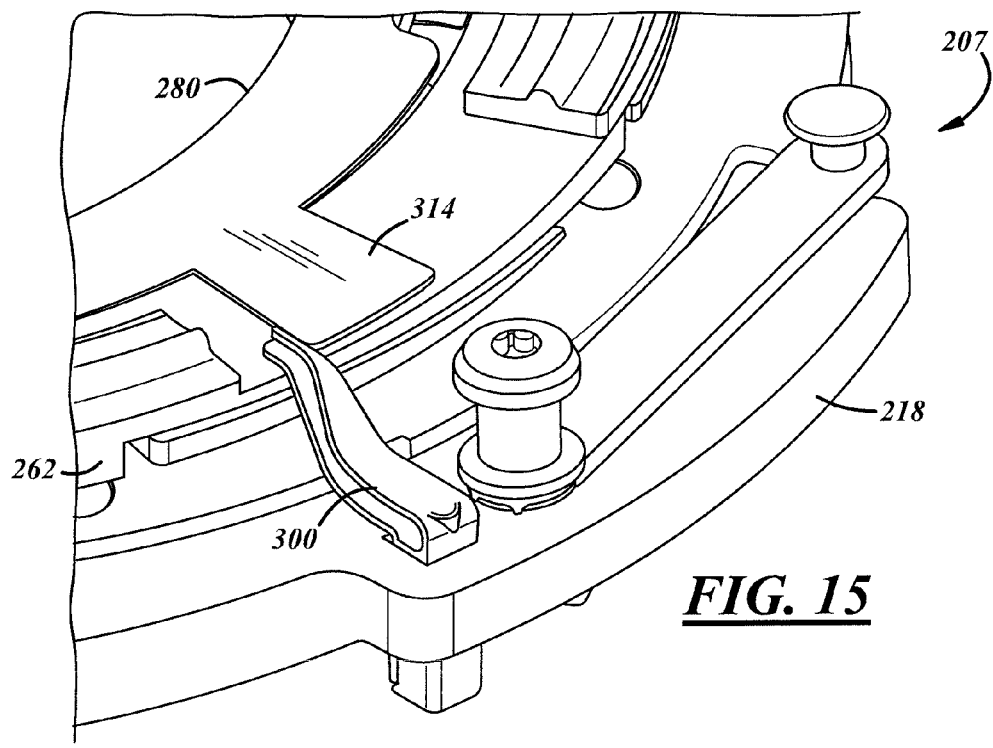
FIG. 15 is a partial perspective view of a clutch according to the present invention in the embodiment of a pull type diaphragm clutch.
Figure 3:
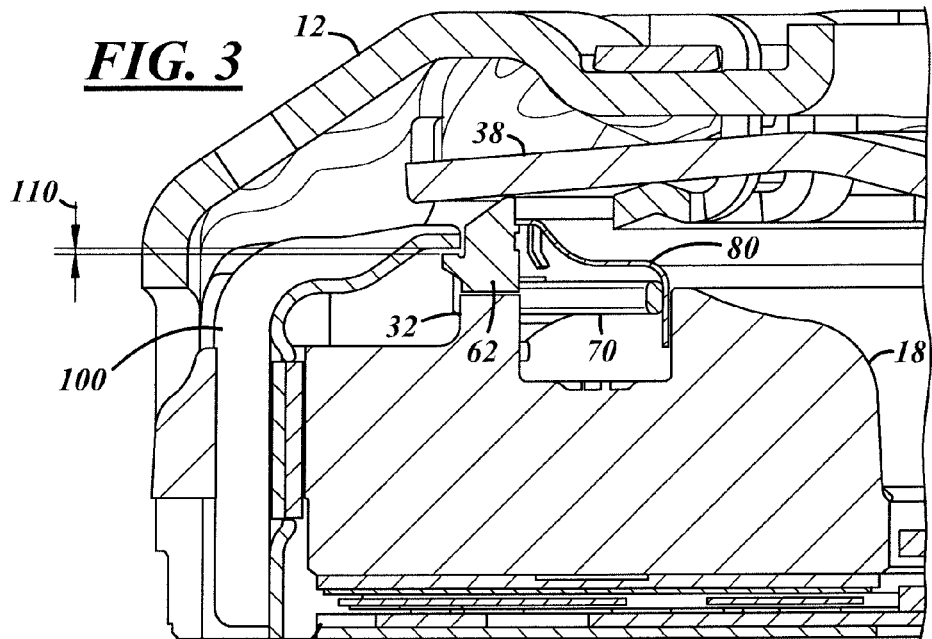
FIG. 3 is a view similar to that of FIG. 2 illustrating the clutch when there is need of adjustment due to wear of the friction disc utilized by the clutch.
Figure 4:
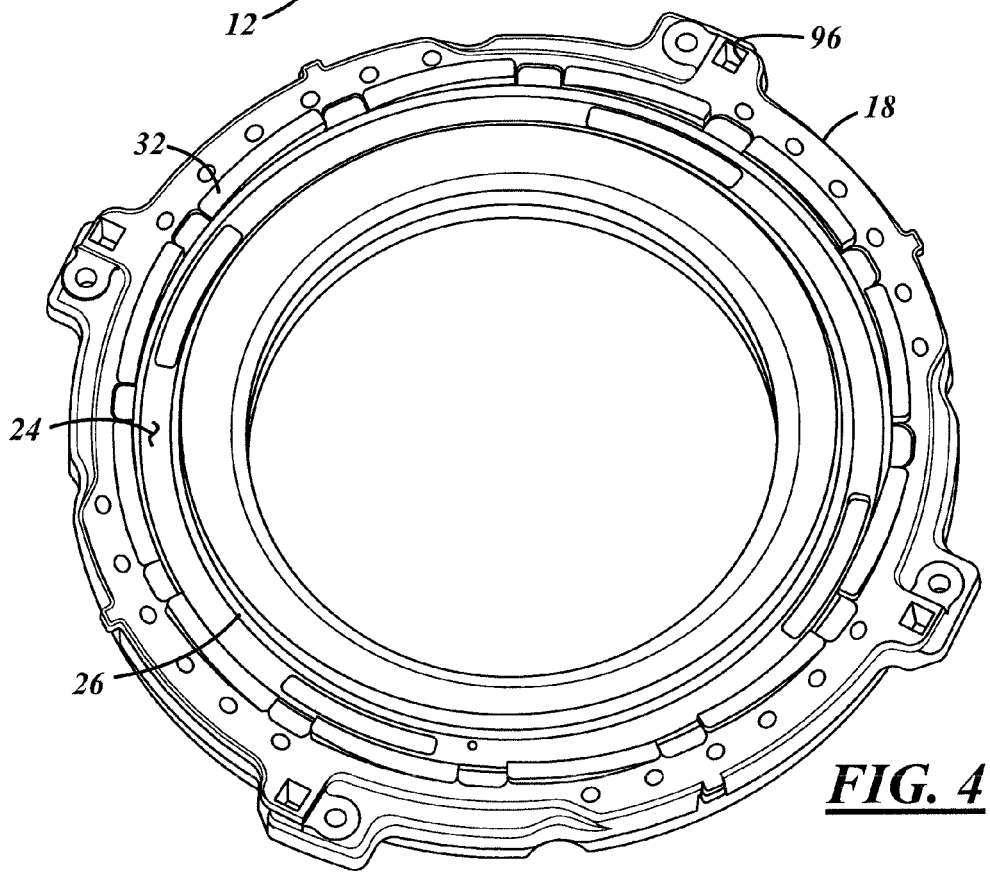
FIG. 4 is a perspective view of a pressure plate utilized in the clutch illustrated in FIG. 1.
Figure 16:
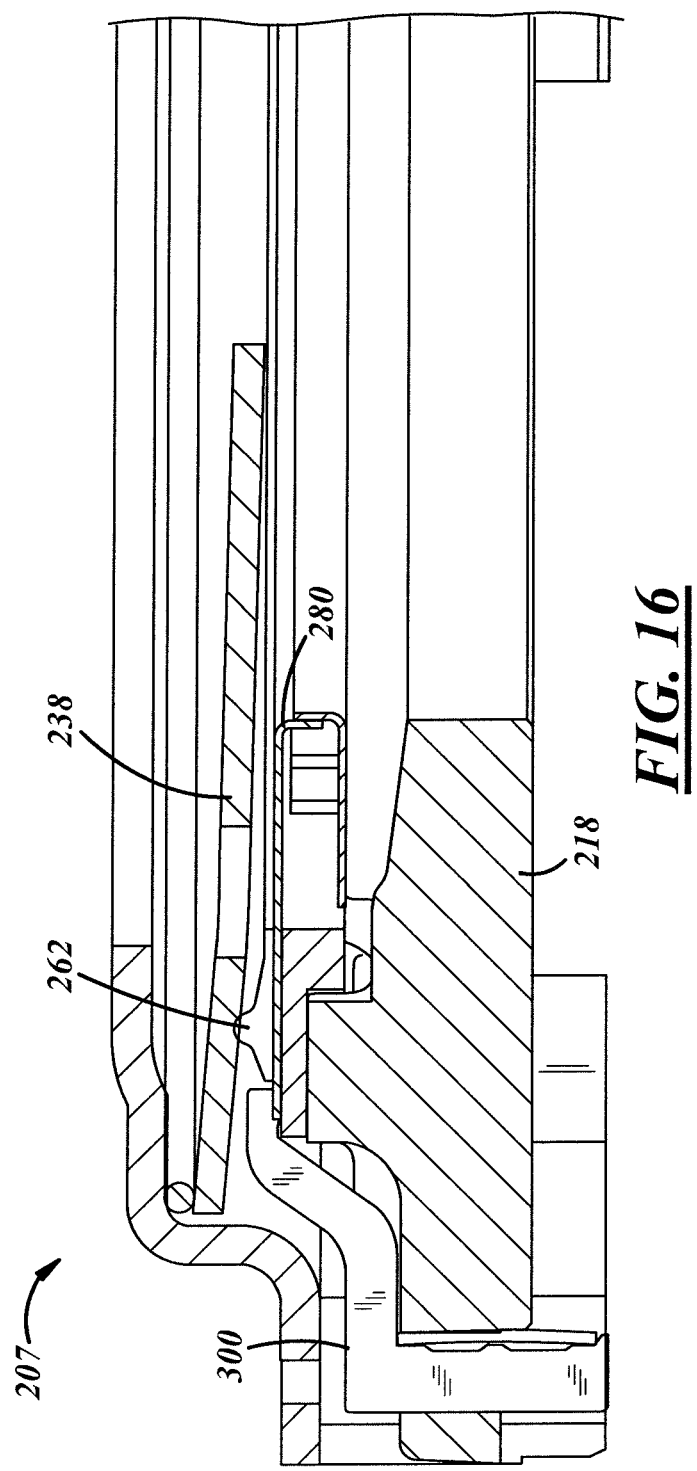
FIG. 16 is a partial sectional view of the clutch shown in FIG. 15.

FIGS. 15 and 16 illustrate a pull type dry clutch 207 having a diaphragm spring 238 contacting a second cam ring 262 which is limited by a control finger 300. The mechanics and operation of the clutch 207 are very similar with the exception that to relieve the pressure plate 218 from engagement with a friction disc (not shown), the diaphragm spring 238 has leaves that are pulled away from the engine flywheel to release the clutch 207. A baffle 280 is provided having radially outward projecting tabs 114 for making contact with the control fingers 300 in a manner essentially similar or identical to that previously described for clutch 207.

Although the current invention has been illustrated in clutches having diaphragm spring clamp members, the current invention can also be utilize in clutches having coil spring-lever release mechanisms wherein the levers act as clamp members.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A selectively engagable dry friction clutch assembly for connecting a transmission with a flywheel of an engine comprising:

a cover having a main body axially spaced from said flywheel and being torsionally connected thereto;

an axially movable pressure plate torsionally connected with said cover;

a friction disc for having torsional connection with an input shaft of a transmission, said friction disc being axially positioned between said flywheel and said pressure plate;

a release assembly including a spring for urging said pressure plate toward said flywheel; and an adjustment assembly juxtaposed between said pressure plate and said spring for compensating for wear of said friction disc, said adjustment assembly including:
  a first cam ring fixed with respect to said pressure plate;
  a second cam ring juxtaposed between said spring and said first cam ring wherein rotation of said second cam ring with respect to said first cam ring changes an effective distance between said spring and an extreme end of said pressure plate;
  a torsional spring connected between said first and second cam ring to urge said second cam ring to rotate with respect to said first cam ring;
  a control finger frictionally connected with said pressure plate in an aperture of said pressure plate, said control finger having an extreme end for contact with said flywheel and a limiting end for restraining relative rotation of said second cam ring with respect to said first cam ring in an absence of wear of said friction disc; and
  a baffle connected with said second cam ring for shielding said torsion spring, said baffle having a tab for making contact with said control finger to limit relative rotation of said second cam ring with respect to said first cam ring.

2. A clutch assembly as described in claim 1 wherein said spring is a diaphragm spring.

3. A clutch assembly as described in claim 2 wherein said clutch is a push type release clutch.

4. A clutch assembly as described in claim 2 wherein said clutch is a pull type clutch.

5. A clutch assembly as described in claim 1 wherein said first cam ring is integral with said pressure plate.

6. A clutch assembly as described in claim 1 wherein said baffle has a snap in fit with said second cam ring.

7. A clutch assembly as described in claim 6 wherein said second cam ring has an inner radial step and a main radial edge of said baffle is positioned upon said second cam ring radial step and wherein said baffle has a barb to engage with said step.

8. A clutch assembly as described in claim 1 wherein a portion of said baffle tab has a V-shape cross-section.

9. A clutch assembly as described in claim 1 wherein said clutch has multiple control fingers and wherein said baffle has multiple tabs for limiting contact with said multiple control fingers.

10. A clutch assembly as described in claim 1 wherein said first and second cam rings have multiple ramps.

11. A clutch assembly as described in claim 1 wherein said pressure plate on a side opposite said friction disc has an annular groove and wherein said annular groove seats said torsion spring and an inner radial surface of said annular groove positions said baffle and said baffle pilots a lateral position of said second cam ring.

12. A clutch assembly as described in claim 1 wherein said pressure plate on a side opposite said friction disc has an annular groove and wherein said annular groove seats said torsion spring and said torsion spring has an eyelet connected with a pin, said pin being connected with said pressure plate within said annular groove and wherein said baffle has a ramp depression to cause a distance between said baffle and said pin to remain less than a thickness of said torsion spring to prevent said torsion spring being released from connection with said pressure pin.

13. A clutch assembly as described in claim 1 wherein said second cam ring has a radial slot and said tab of said baffle projects radially outward through said radial slot.

14. A selectively engagable dry friction clutch assembly for connecting a transmission with a flywheel of an engine comprising:
  a cover having a main body axially spaced from said flywheel and being torsionally connected thereto;
  an axially movable pressure plate torsionally connected with said cover, said pressure plate on a side opposite said flywheel having an annular groove with an inner radial wall, said pressure plate also having a connected pin;
  a friction disc for having torsional connection with an input shaft of a transmission, said friction disc being axially positioned between said flywheel and said pressure plate;
  a release assembly including a push type diaphragm spring for urging said pressure plate toward said flywheel; and
  an adjustment assembly juxtaposed between said pressure plate and said spring for compensating for wear of said friction disc, said adjustment assembly including:
    a multiple ramp first cam ring integral with said pressure plate;
    a multiple ramp second cam ring juxtaposed between said diaphragm spring and said first cam ring wherein rotation of said second cam ring with respect to said first cam ring changes an effective distance between said spring and an extreme end of said pressure plate, said second cam ring having an inner step and an outer radial rim and said second cam ring having a series of radial slots;
    a torsional spring positioned within said pressure plate annular groove connected between said pin in said pressure plate and said second cam ring to urge said second cam ring to rotate with respect to said first cam ring;
    control fingers frictionally connected with said pressure plate in rectangular apertures of said pressure plate, said control fingers having an extreme end for contact with said flywheel and a limiting end for restraining rotation of said second cam ring by contact with said second cam ring outer radial rim in an absence of wear of said friction disc; and
    a baffle snap fit connected with said second cam ring for shielding said torsion spring, said baffle having tabs projecting through said second cam ring radial slots for making contact with said control fingers to limit relative rotation of said second cam ring with respect to said first cam ring, and said baffle having a main radial edge for positioning on said second cam ring step with a barb to engage said step, said baffle having an inner radial wall to position adjacent said pressure plate radial inner wall to pilot position said second cam ring and said baffle having a ramped depression to prevent said torsion spring from losing connection with said pressure plate.

15. An adjustment assembly for a selectively engagable dry friction clutch assembly for connecting a transmission with a flywheel of an engine wherein the clutch assembly includes a cover having a main body axially spaced from the flywheel and being torsionally connected thereto;
  an axially movable pressure plate torsionally connected with said cover;
  a friction disc for having torsional connection with an input shaft of a transmission, said friction disc being axially positioned between said flywheel and said pressure plate;
  a release assembly including a clamp force member;
  said adjustment assembly comprising:

a first cam ring fixed with respect to the pressure plate;

a second cam ring juxtaposed between a clamp force member and the first cam ring wherein rotation of the second cam ring changes an effective distance between the clamp force member and an extreme end of the pressure plate;

a torsional spring connected between the first and second cam rings to cause the second cam ring to rotate;

a control finger for frictional connection in an aperture of said pressure plate, said control finger having an extreme end for contact with said flywheel and a limiting end for restraining rotation of said second cam ring in an absence of wear of said friction disc; and a baffle connected with said second cam ring for protecting said torsional spring, said baffle having a tab for making contact with said control finger to limit rotation of said second cam ring.

16. An adjustment assembly as described in claim 15 wherein said baffle has a snap fit to said second cam ring.

17. An adjustment assembly as described in claim 16 wherein said second cam ring has an inner radial step and wherein said baffle has a main radial edge for placement on said step and a barb from a down stamped finger for engagement with said step.

18. An adjustment device as described in claim 15 wherein said second cam ring has a radial slot and said baffle tab projects through said radial slot.

19. An adjustment device as described in claim 15 wherein said baffle has an inner radial wall for pilot positioning with a radially inner wall of a pressure plate having an annular groove.

20. An adjustment assembly as described in claim 15 wherein said baffle has ramp depression to set a minimum distance that is less than a thickness of said torsion spring between said baffle and a pin connected with said pressure plate utilized for connection with said torsional spring.

* * * * *